Oct. 30, 1928.
C. P. BROCKWAY
1,689,546
TRACTOR
Filed May 12, 1921
10 Sheets-Sheet 4
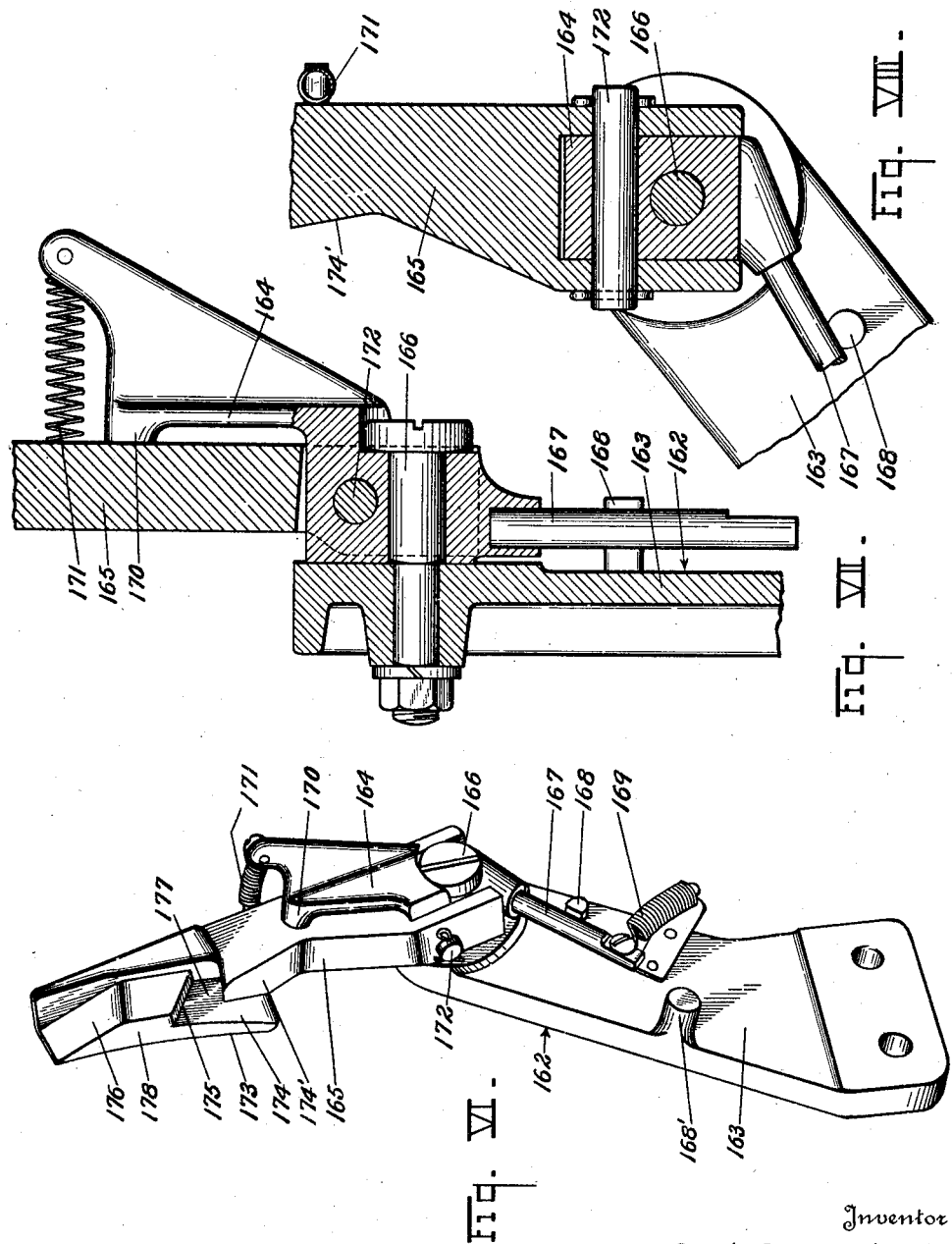
Inventor
Carl P. Brockway
By Chester H Braselton
Attorney

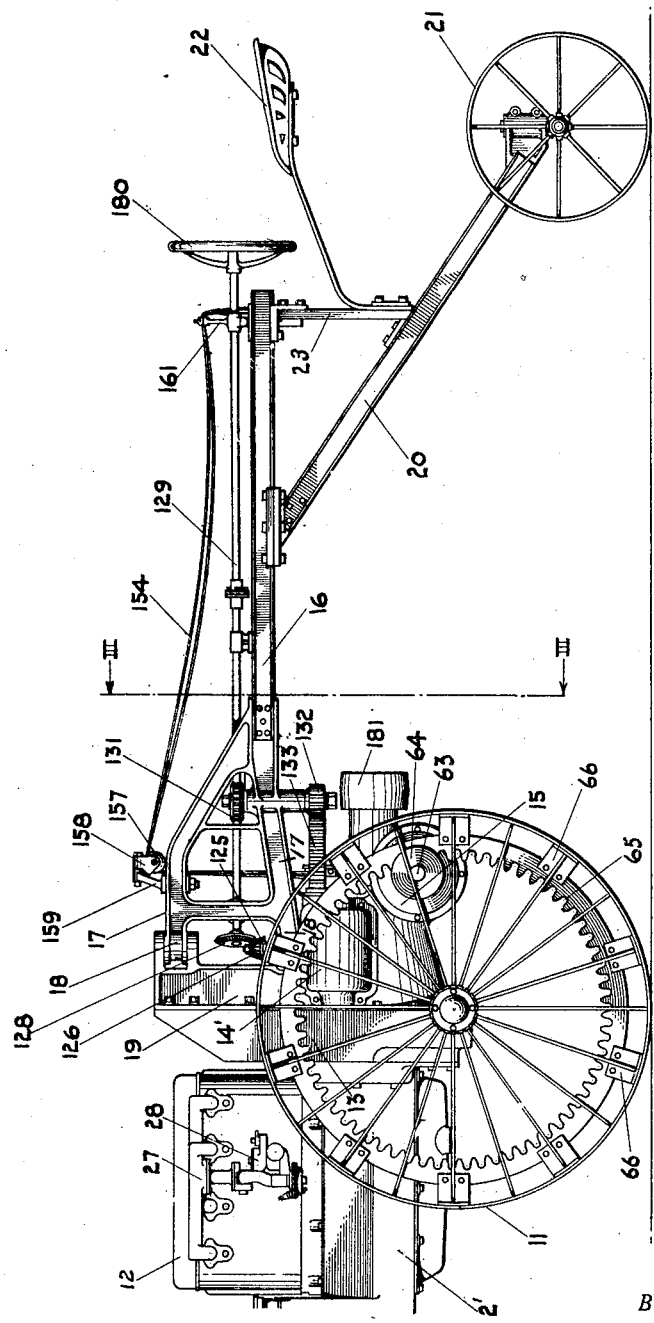

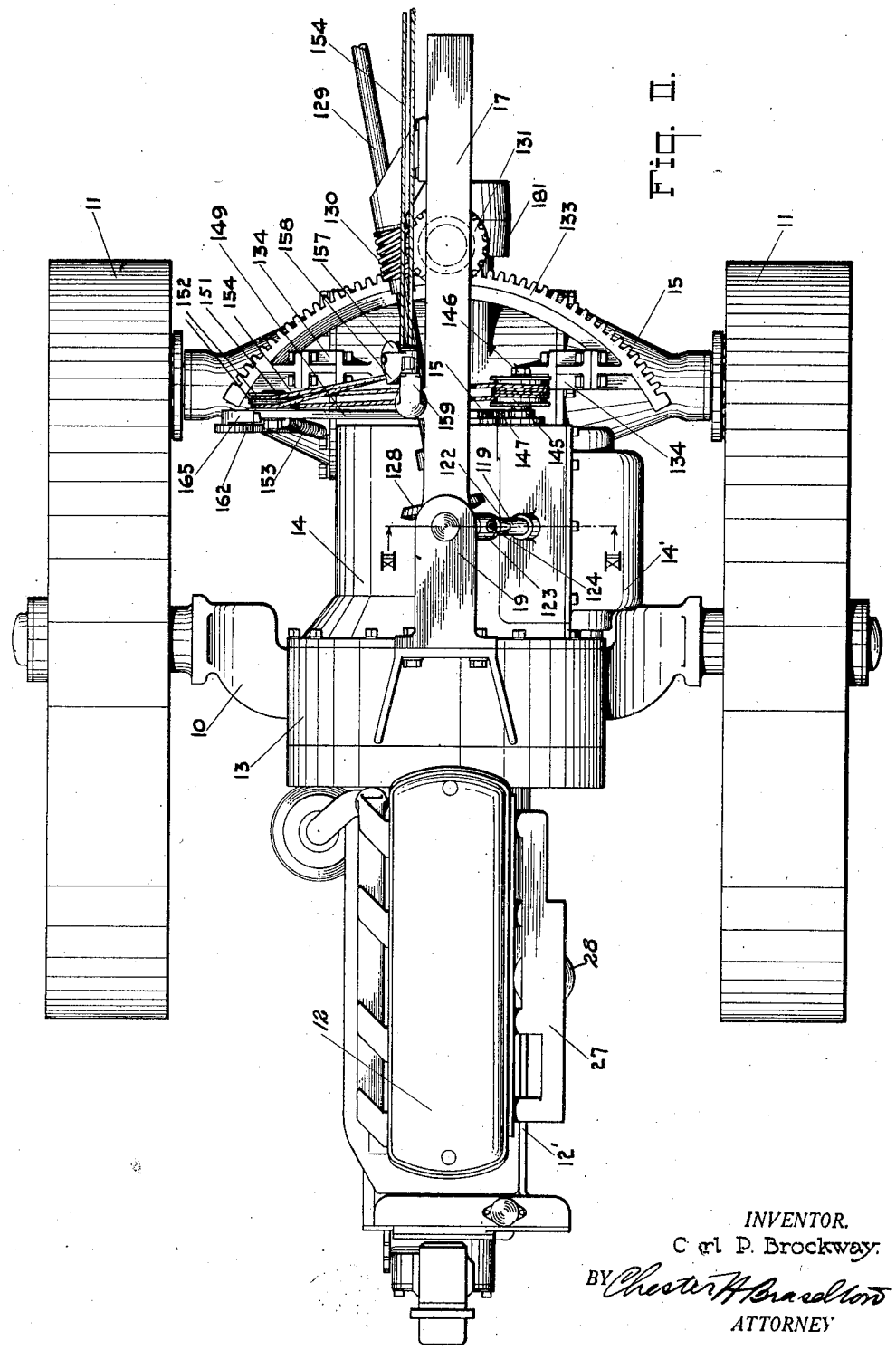

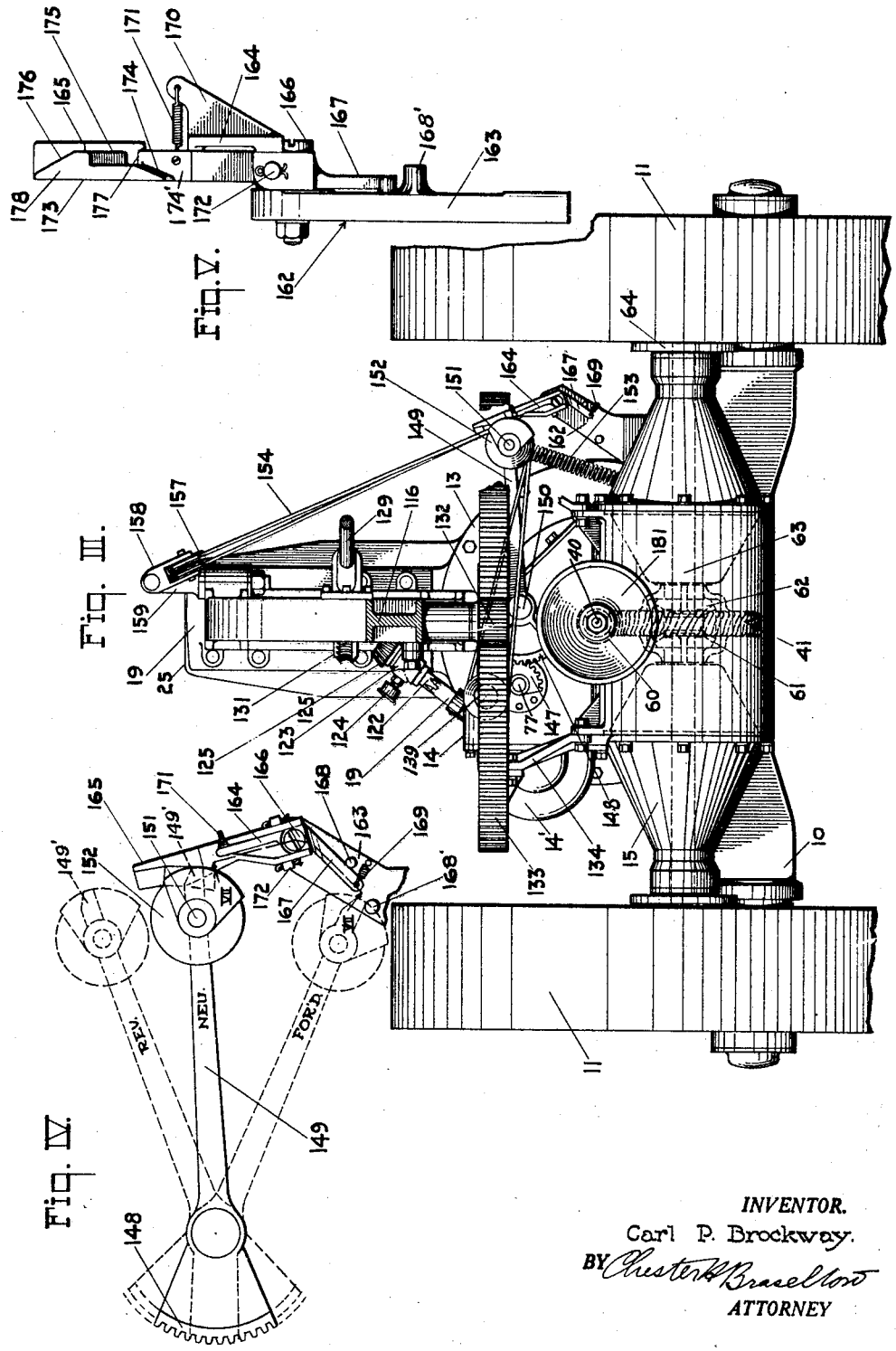

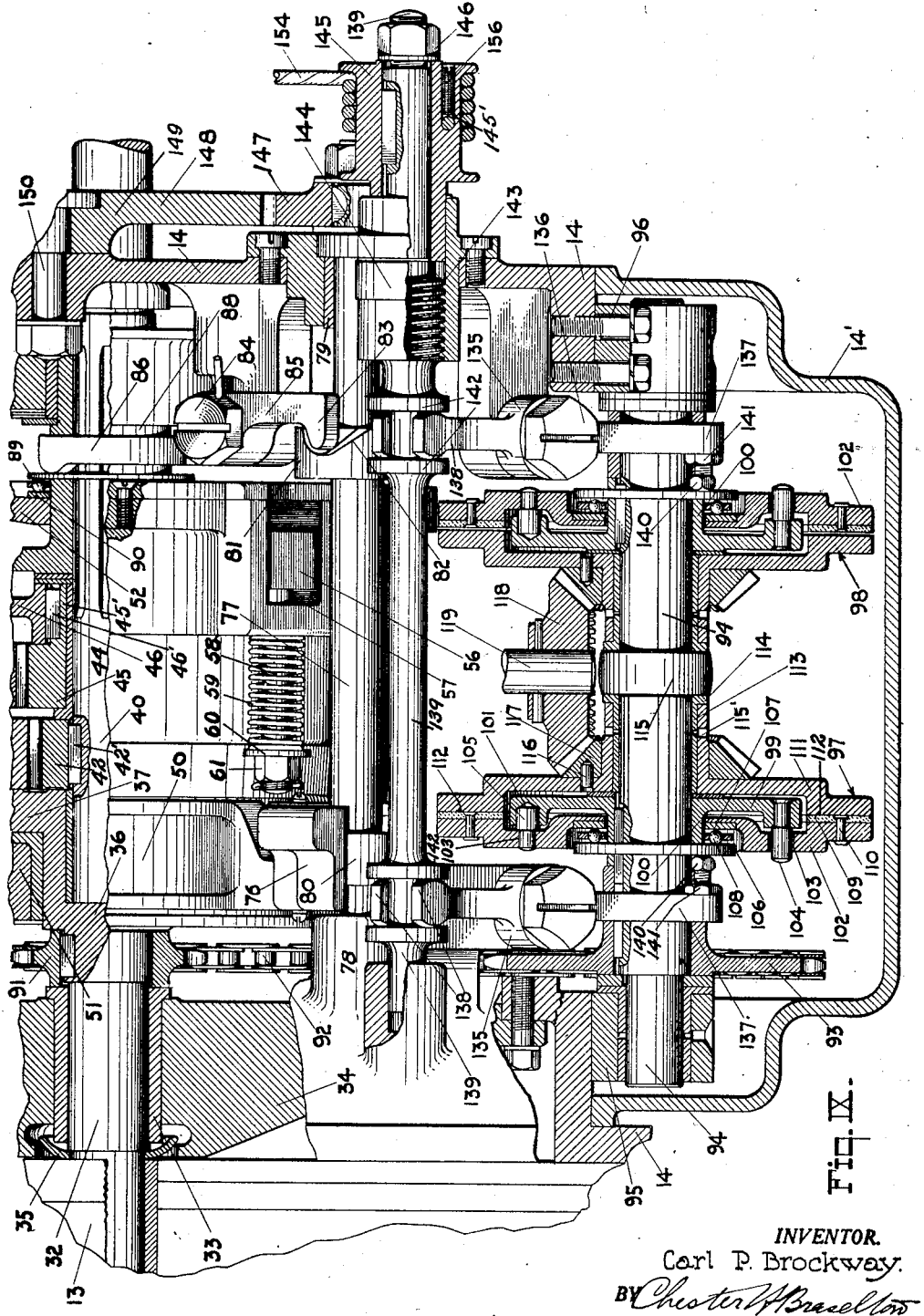

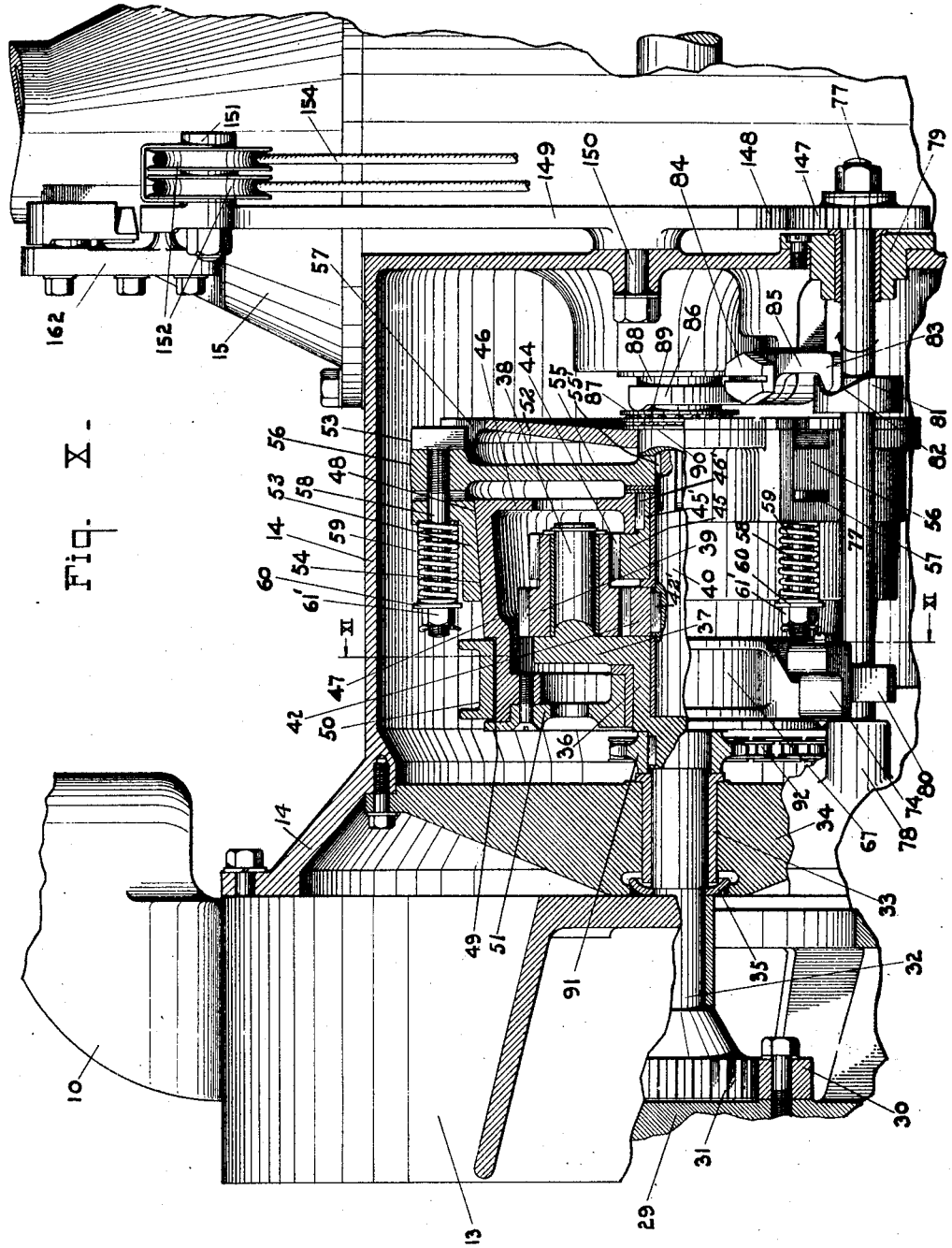

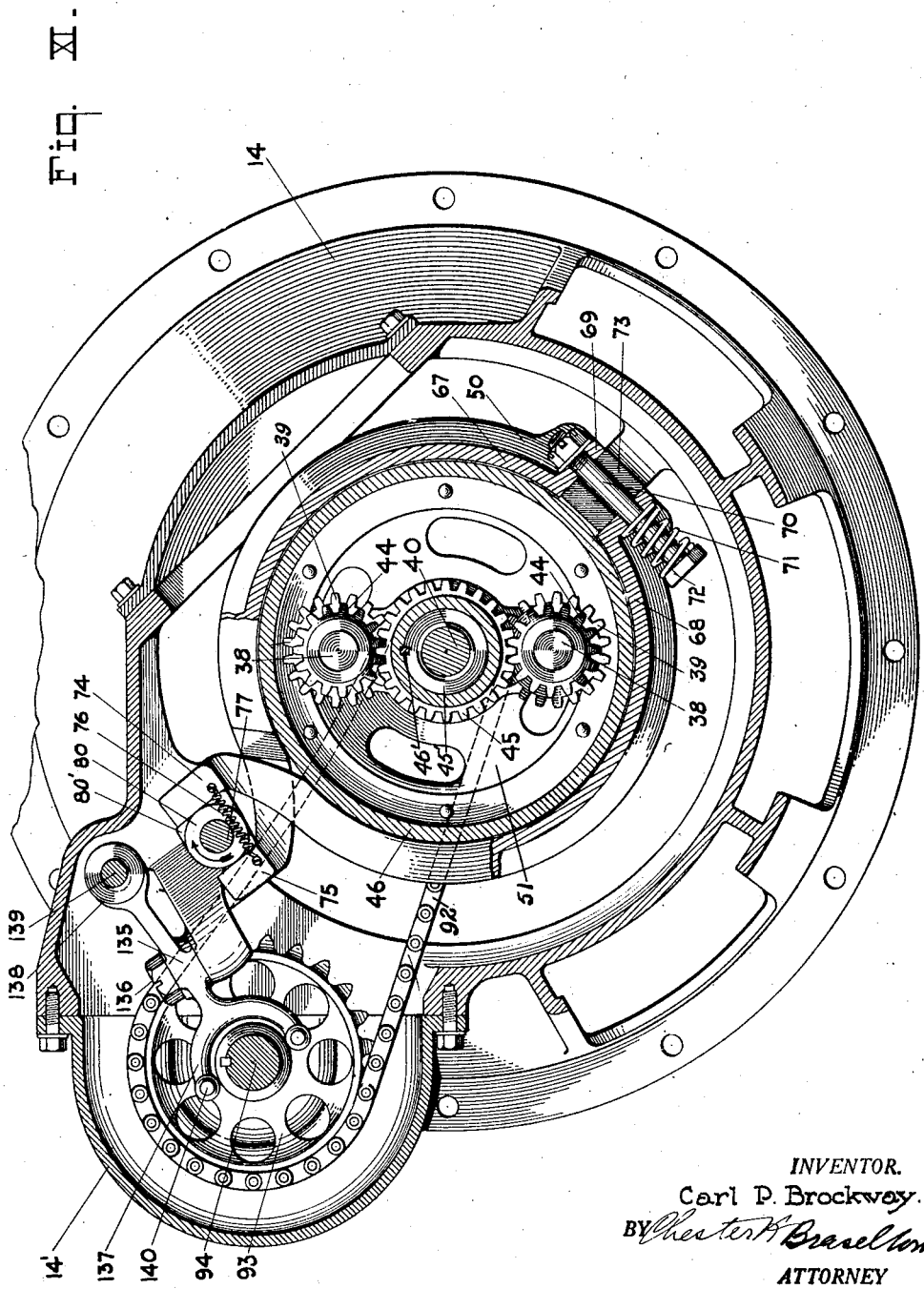

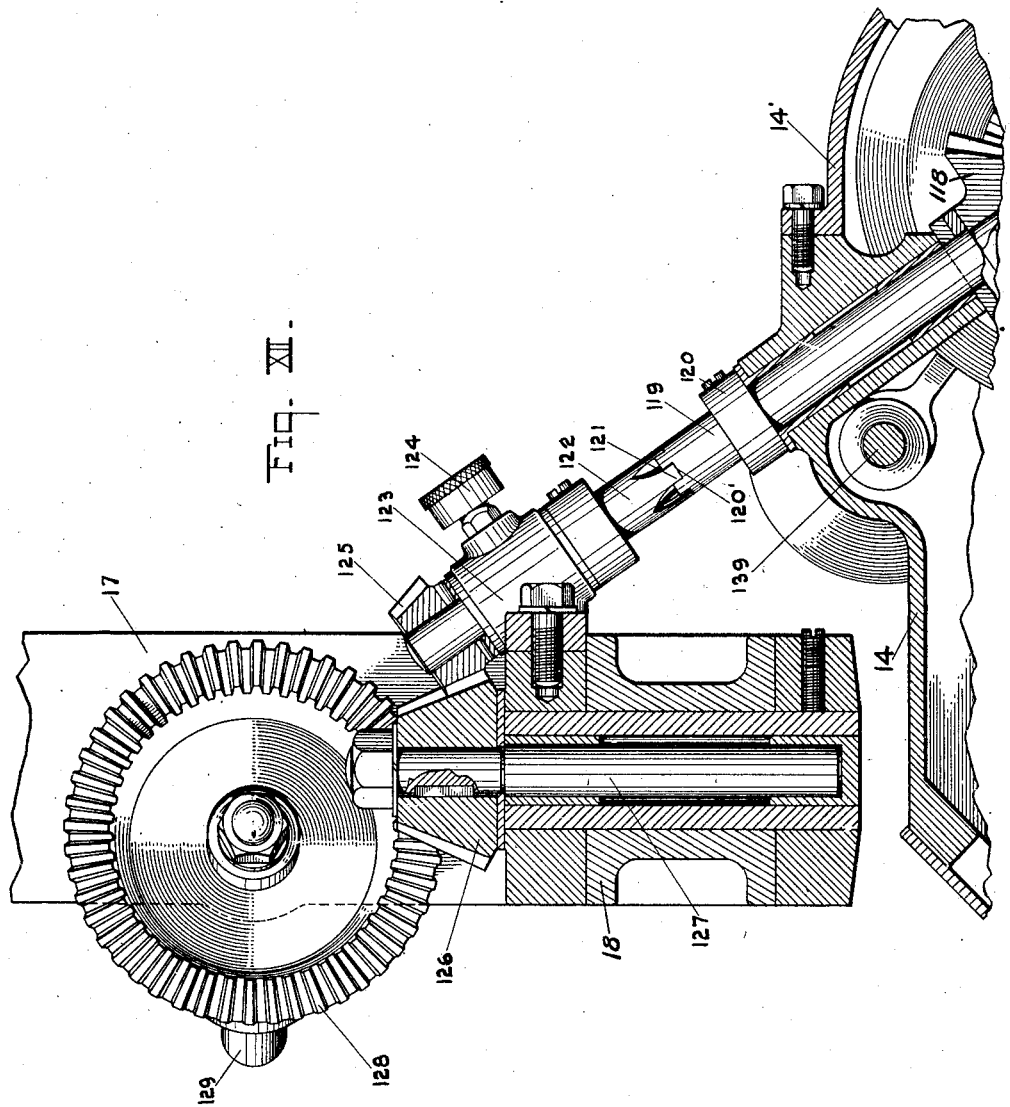

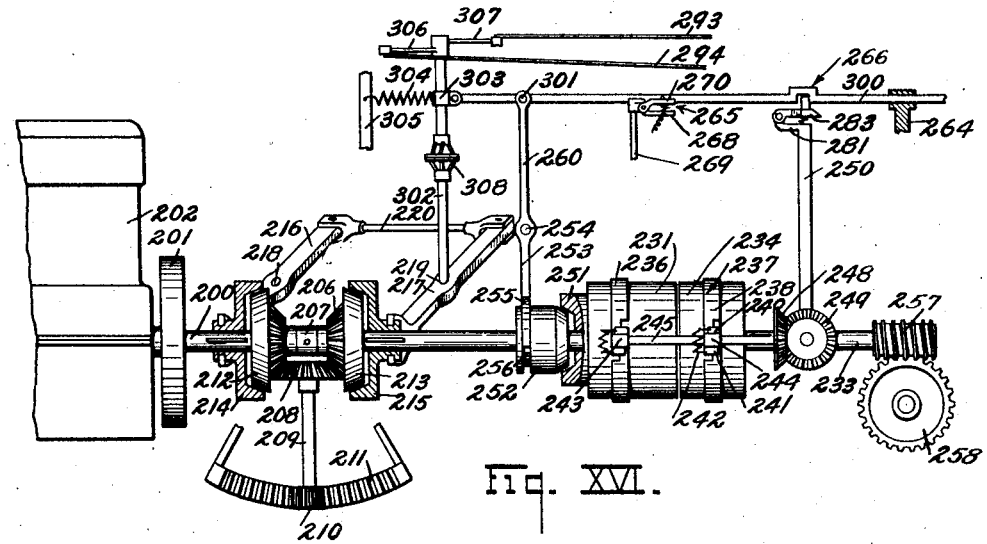
Fig. XVI.
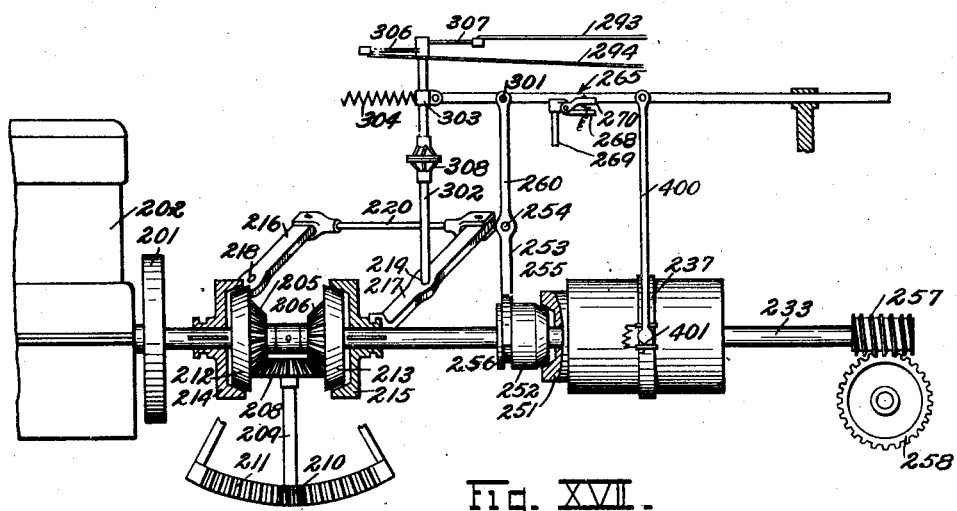
Fig. XVII.
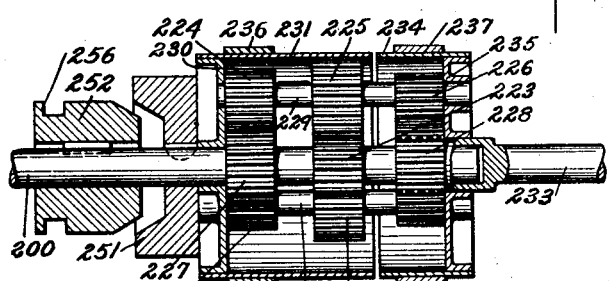
Fig. XVIII.
Inventor
Carl P. Brockway
By Chester H. Braselton
Attorney

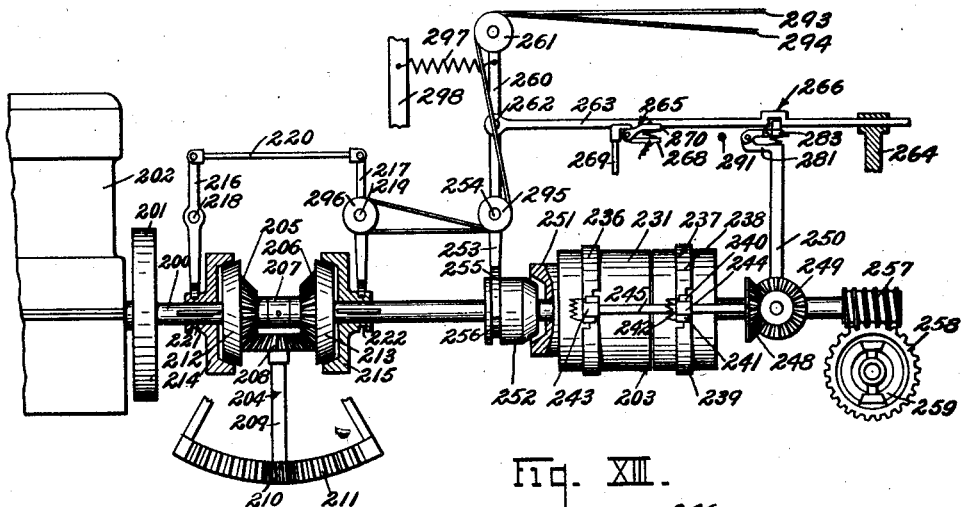
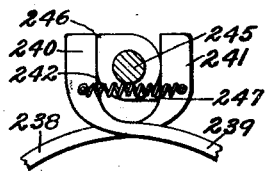
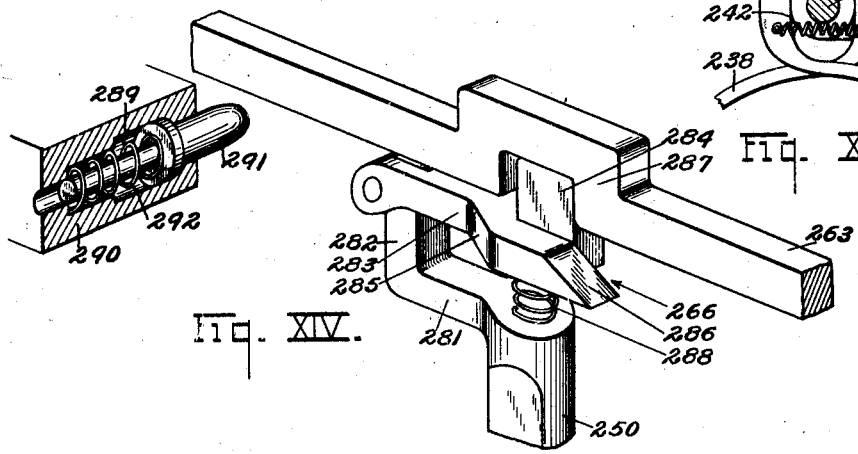
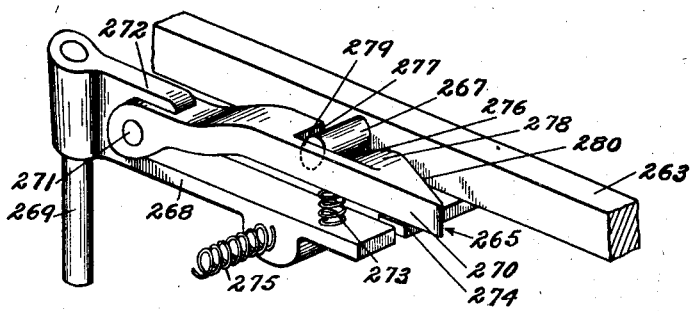

Patented Oct. 30, 1928.

1,689,546

UNITED STATES PATENT OFFICE.

CARL P. BROCKWAY, OF TOLEDO, OHIO, ASSIGNOR TO INDUSTRIAL RESEARCH CORPORATION, OF TOLEDO, OHIO, A CORPORATION OF DELAWARE.

TRACTOR.

Application filed May 12, 1921. Serial No. 468,941.

This invention relates to a novel tractor construction; to a control mechanism for tractors; to the operative mechanism thereof and to the general combination and specific elements shown as will appear from the disclosure herein. In general the invention contemplates the provision of such a mechanism, and of means for controlling the driving and steering of a tractor or other automotive vehicle by means of a flexible line or lines held in the hand of the operator although rigid means may be employed.

An object of the invention is to provide control means which embody maximum flexibility in adjustment and use and one having the cycle of required operative movements not only reduced to a minimum but made extremely simple.

Another object is to make possible easy control of the power transmission from various positions and various distances relative to the tractor thereby permitting the operator to take the position on the tractor, or on the load attached to the tractor, most convenient for proper supervision.

The invention further is designed to permit operation of the transmission gears and steering mechanism by a single pair of reins or to provide a mechanism in which all operations may be controlled by a single flexible or other type of manually operable agency.

It is an object also to embody structure in the transmission where forward, neutral, and reverse positions are relatively fixed and clearly defined so that movement from one position to the other is positive.

Another object considered is the employment of a transmission where the mechanism is normally to be maintained in neutral position but movable to forward position by a simple latch releasing action and relaxing the reins, and hence to neutral and reverse position by a simple continued rearward pull on the reins.

An important object of the invention is the provision of a single means operable to move the transmission to forward, neutral, and reverse positions and simultaneously to control the steering mechanism at any point of the transmission shifting operation.

Still another object is the utilization of mechanism so designed that a single pair of reins controls two forward speeds, reverse speed, neutral, and the steering of the tractor.

Other objects, and objects relating to economies of manufacture and details of construction will become apparent from the subsequent description and drawings wherein Figure I is a side elevation of a complete tractor;

Figure II is a plan view of the main body of the tractor;

Figure III is a view taken on lines III—III of Figure I;

Figure IV is a detail view of a portion of the control mechanism;

Figure V shows the control latching device;

Figure VI is a perspective view of the latch;

Figures VII and VIII are detailed sectional views of the latch;

Figure IX is a view of the transmission and steering mechanism with the casing cut away;

Figure X is a detailed view, partly in section, of the transmission mechanism;

Figure XI is a section through the transmission taken on lines XI—XI of Figure X.

Figure XII is a section on lines XII—XII of Figure II showing a portion of the steering mechanism;

Figure XIII is a partial diagrammatic view of a modification in which the tractor is provided with two forward speeds and the simplified control is incorporated therein;

Figure XIII<sup>A</sup> is a detail of the transmission brake end connections;

Figure XIV and Figure XV are perspective views of the latch details used in the arrangement of Figure XIII;

Figure XVI is a view of a further modification in which both the drive transmission with two speeds forward and the steering are controlled through a common operable member;

Figure XVII is a view of a modification in which a common control member actuates both the driving transmission and steering where only one speed forward is illustrated;

Figure XVIII illustrates the transmission gearing of Figure XIII and Figure XVI.

In the various figures of the drawings similar reference characters refer to like parts, and the sectional views are taken looking in the direction of the arrows.

In general, the tractor comprises a wheeled support carrying a power plant including an engine, cooling system and necessary adjuncts; driving mechanism mounted on the support; steering mechanism operable by the driving mechanism, all, moreover, arranged in a general balancing assembly; and a control preferably by line, for controlling the operation of the steering and driving mechanism.

The tractor support comprises an axle 10 which is mounted on the two traction wheels 11 having an engine 12, a casing 12', fly-wheel casing 13, transmission casing 14, steering clutch casing 14', and cross shaft casing 15 bolted rigidly together and since the axle is fixed to the fly-wheel casing, the whole tractor has a balanced pivot on the traction wheels.

The draw bar 16 is bolted to the frame 17, the upper and lower bifurcated ends 18 of which are pivotally secured to a standard 19 mounted on the fly-wheel casing 13. To the draw bar 16 may be secured any desired implement such as a plow, or merely as illustrated, a follower support 20 to which is secured the wheel 21 and seat 22, the cross bar 23 serving as a binding support.

The driving mechanism includes the engine 12, a preferably planetary transmission, a drive shaft, and gear connections between the drive shaft and the traction wheels.

The engine 12 is here illustrated as of the air-cooled type of internal combustion engine but may be of any conventional type. A hand starter 26, intake manifold 27, and carburetor 28 are indicated.

To the rear face of the engine fly-wheel 29 (Figure X) is bolted the internally toothed annular ring 30, and in interlocking and non-rotatable engagement with this ring is the externally toothed member 31 integral with the transmission shaft 32. This form of interconnection between the transmission shaft and fly-wheel forms a substantially fixed torque transmitting connection but permits slight lateral play of the shaft without interference with the torque transmission.

The transmission shaft 32 has a bearing 33 placed in a supporting member 34 bolted to the transmission casing. An oil washer 35 is shown in the supporting member external to the bushing 33, its function being to retain oil from the transmission gears.

The transmission shaft terminates in the transmission casing in a hollow stub 36, (Figures IX and X) the inner end of which is expanded in the form of a bearing plate 37 having pivots 38 integral with the plate face which carry the double planetary pinions 39 as clearly illustrated in Figures X and XI.

The drive shaft 40 extends into and has a bearing in the hollow terminal stub shaft 36 integral with the transmission shaft. At the other end of the drive shaft is formed a worm gear meshing with the worm-wheel 41 on the transverse tractor driving shafts, illustrated in dotted outline in Figure III.

The sun gear 42 of the planetary transmission is keyed to the drive shaft 40 by key 42' and is in mesh with the two pinions 39 of the double planetary pinions. The planetary pinions 44 smaller than gears 39 and formed integral with the pinions 39, are in mesh with an orbital gear 45 loosely mounted on the drive shaft 40. The pinion 45 is laterally extended in a sleeve 45' and to the extension 45' the element 46 of the clutch is rigidly secured by key 46'.

This clutch element 46 is of drum shape, the periphery 47 having a forwardly converging face 48 to form the clutching surface and an annular channel 49 forming a braking surface for the clutch brake 50. The forward end 51 of the clutch drum has a loose bearing on the transmission stub shaft 36.

Means are provided to suitably support and operatively carry a clutch member adapted to cooperate with the clutch element 46. To this end a spider 55 is fixed to the shaft 40 through a locking means 55', one of the arms of the spider being shown in section in Figure X and each of the arms being provided with heads 56. The hub of the spider 55 extends rearwardly as shown in Figure X and on this hub is carried a dish-shaped flanged plate 52 having a forwardly converging flange permitting a clutch member 53 to cooperate with the clutch surface 48. This disk-shaped member 52 is provided with a series of notches 57 within which the heads 56 of the spider 55 may slide longitudinally of the tractor.

In the operation of the transmission it is essential that these clutch surfaces 48 and 53 should tend to normally be in engagement and to accomplish this result the spider 55 having the three projecting arms 56 is provided with bolts 58 which are threaded in the terminals of the arms 56 and which extend forwardly through the clutch member 53 and retain spring 59 by means of washers 60 and nuts 61'. The springs 59 are under compression and hence the clutching surface 53 is normally urged rearward to engage the corresponding clutch surface 48, this being the driving or forward position. The dish-shaped plate 52 is movable axially by mechanism to be described to operate the forward clutch.

The gear connection between the traction wheels and drive shaft 40 includes the worm gear 60 fixedly mounted on shaft 40 (Figure III), worm wheel 41, differential gears 61 and 62, cross stub shafts 63 and bull pinions 64, as illustrated in dotted outline in Figure III. The bull pinions mesh with internal spur gears 65 which are secured to the wheel 10 by plates 66.

A clutch brake 50 is shown in detail in Figure XI of the drawings. There are two half brake bands 67 and 68 which, at adjacent ends, have outstanding lugs 69 which latter are yieldingly bolted by means of bolt 70 and spring 71 compressed between the bolt nut 72 and adjacent brake lug, to a portion 73 of the transmission casing. The other ends of the brake bands 67 and 68 terminate in radially extending jaws 74 and 75, which jaws have their supporting portions crossed and cutaway at the point of crossing, the band 67 on the rearward face, the band 68 on the forward face thus placing the adjacent faces of the jaws 74 in parallel transverse relationship. A spring 76, attached to each jaw tends to move the jaws together.

The operative mechanism shown for actuating the brake band and the clutch member is mounted on a single stub shaft 77 lying parallel to the drive shaft 40. The forward end of the shaft 77 is revolvably mounted in the forward wall of the transmission casing at 78 and the rear end of the shaft is mounted in a detachable bearing 79 secured to the rear face of the transmission casing.

There are two cam elements 80 and 81 on the stub shaft 77, the one for operating the brake band, the other for operating the clutch. The brake cam 80 as shown in Figure XI has an approximately V-form camming projection 80' which is normally in the position as shown with one face in contact with the inner face of the brake jaw 75. In this position the brake bands are disengaged. Rotation of the shaft 77 in a clockwise direction will be followed on engagement of the cam and jaw face 74 by spreading of the jaws against the tension of spring 76 thereby clamping the brake bands to the clutch member 47.

The other cam element 81 is adapted to operate so as to slide clutch member 53 forward against the springs 59 to release the clutch. As shown this cam 81 is incorporated in a small wheel a portion of the rear face of which is cut to form the camming surface 82. Adapted to rest on this camming surface is one arm 83 of a double armed lever 85. This lever is pivotally secured at its center to a forward projection of the rear face of the transmission casing by means of a machine screw 84 and the other arm consists in a forked projection 86 extending toward the drive shaft and surrounding the same, the terminals of said projections being rounded and forwardly extended so as to give a proper bearing with the thrust plate 87 in contact with clutch plate 52 and slidably mounted on the hub 88 of the clutch spider 55. Force is transmitted to the clutch plate 52 from the fork terminals through a ball bearing 89 and forward thrust plate 90.

From the description heretofore made it is apparent that clockwise rotation of the control or cam shaft 77 will first force the clutch element 53 forward to neutral or disengaged position and that continued rotation of the cam shaft will hold the clutch open, the bearing of the lever arm 83 merely riding on the rear face of the cam 81. Subsequent to the disengagement of the clutch and upon a more continued movement of shaft 77 the other cam 80' on control shaft 77 becomes effective to force the brake elements together thereby effecting a readjustment of the planetary gears for reverse movement of the transmission as will hereinafter appear.

The steering mechanism of the tractor is power operated. To the transmission shaft 32 is keyed a chain gear 91 from which power is transmitted, by means of a chain 92, to a second chain gear 93 keyed to a counter shaft 94 (Figures IX and XI). This shaft 94 is parallel to the transmission shaft and is mounted in bearings 95 and 96 secured to the transmission casing.

Two friction clutches 97 and 98 are associated with the counter shaft 94 each clutch being identical in contruction but one placed reversely to the other.

In the following description of the clutches therefore, corresponding parts will be similarly numbered but the description will refer only to clutch 97.

Considering clutch 97 in detail it embodies a middle plate 99 keyed to the counter shaft, the hub of the plate having a forward extension 100. The forward face of this plate 99 near its edge is formed with a series of holes 101 for a purpose hereinafter to be described. Loosely mounted on the plate hub 100 is a forward plate 102 which also has a plurality of holes 103 cut therein. The holes 103 and 101 of the two plates are designed to register and in some of the holes 101 pins 104 are fixed and in some of the holes 103 pins 105 are fixed, the pins having free axial movement in the holes opposite to those wherein they are attached. It is evident that this form of pin engagement permits free limited axial movement on the shaft between the plates without interfering with the transmission of torque. On the hub 100 of the plate 99 are positioned the thrust plates 106 and 107 between which the roller bearings 108 are placed.

The peripheral portion of the clutch plate 102 is offset to the rear over the middle plate 99 and the rear face is covered by friction fabric 109 securely fastened thereto by rivets 110. Adapted to co-operate and have frictional engagement with the clutch member 102 is a second clutch member 111 the outer portion of which is offset in the forward direction over the middle plate thus forming an annular gripping surface 112.

The hub of the friction plate 111 is rearwardly extended and mounted non-rotatably on a bushing 113, the rearward end 114 of which is out-turned and rests against an integral central collar 115 on the clutch shaft 94. The bushing 113 is freely rotatable relative to the shaft so that the rotative force of the shaft is not transmitted thereto.

An oil passage 115' through the hub extension of clutch element 111 and the bushing is shown.

Fixed to the rear face of the clutch element 111 at its hub by means of pins 116, is a bevel gear 117 which is normally in mesh with a driven bevel 118. The gear 118 is directly secured to the stub shaft 119 (Figures VI and IX), which in turn has an adjustable bearing (Figure XII) in the transmission case by means of a collar 120. The shaft 119 is formed at the upper end with a series of notches 120' cut in the periphery which are adapted to register with corresponding fingers 121 projecting from the base of a second stub shaft 122, for the purpose of permitting ready assembly. The shaft 122 has a bearing 123 on the lower pivot support 18 of the frame 17 and for lubrication a grease cup 124 is fixed to the bearing. The upper end of the shaft 122 carries a bevel pinion 125 which meshes with a vertical bevel pinion 126 fixed on a pin 127 rotatably mounted on the pivot support 18 above mentioned. A bevel gear 128 is in mesh with the pivot bevel 126 and is fixed to a shaft 129 supported in bearings on the draw bar frame 17 at such an angle relative to the draw bar 16 that an extension of the shaft if used carries it to the rear end of the draw bar in a position convenient to the operator.

On the shaft 129 is a worm gear 130 (Figures II and I) meshing with a worm wheel 131. The shaft of the worm wheel is vertical (Figure I) and is mounted on the draw bar frame 17, and to its lower end is fixed a horizontal pinion 132 meshing with the arcuate rack 133 (Figures I and II) which latter is secured to the cross shaft casing 15 by means of standards 134. It is apparent that rotation of the pinion 132 in either direction will, by virtue of the meshing engagement of the pinion and rack 133, cause relative lateral movement of the draw bar and rear of the tractor casing, thus forcing the traction wheels to swing on the pivots 18.

As stated, an important feature of this invention is the control of steering by power actuated means under the operator's control in driving the tractor and to this end, referring to Figures IX and XI, each of the movable clutch members 97 and 98 are adapted to be shifted on the clutch shaft 94 by means of one of two sets of levers 135, located at opposite ends of a common control shaft 139, said levers being pivotally secured to the frame by screws 136, the opposite ends of these levers being forked, the lower ends 137 straddling the clutch shaft 94 and the upper end 138 straddling a common control shaft 139. The lower forks 137 have machine screws 140 set in their inner surfaces and locked thereto by locknuts 141. The objects of these screws is to obtain an adjustable bearing from the fork ends to the thrust plates 100 and thence to the clutch member 102.

The upper fork ends 138 of the levers 135 are set between collars 142 integral with the control 139, and the lateral bearing edges of the fork ends are rounded as shown in Figure IX to form a rolling surface on the inner sides of the collars 142 above mentioned.

The control shaft 139 has a screw threaded portion 143 adapted to have threaded engagement with an internally threaded sleeve 144 mounted on the casing. The rear end of the control shaft extends outwardly from the casing and carries a drum 145 keyed to the shaft. A nut 146 holds the drum and control shaft in proper relationship. As will hereinafter appear, steering is controlled by rotating the drum 145 which, by screw threaded engagement with shaft 139, slides the shaft forwardly or rearwardly dependent upon the rotation of the drum 145. This will cause the tilting of the levers 135 forwardly or rearwardly because of the fork and collar connection between the shaft 139 and the levers. If the shaft 139 is slid forward the lever 135 so moves that the lower fork 137 moves rearward. This will slide the clutch member 102 rearwardly because of the engagement of hubs 140 on the forks 137 with the thrust plate 106 which will move the rotating clutch plate 102 rearwardly, the same sliding on the pins 104 and 105 by which it is driven from the plate 99. This will cause a clutching engagement between the surfaces 109 and 112 and consequent drive through the bevel gears of the shaft 119 in one direction. If the shaft 139 is moved rearwardly the other clutch 98 will be thrown into engagement and this will drive the shaft 119 in the opposite direction.

Both the transmission and steering mechanism are designed for control by a common control element, namely a pair of reins or lines. To accomplish this result the drive control cam shaft 77 and steering clutch control shaft 139 are interconnected by the following means. On the end of the drive control shaft 77 external to the transmission casing is a gear sector 147 which is adapted to mesh with a similar sector 148, located at one end of a lever 149 which is pivoted on the rear face of the transmission at 150. The lever portion opposite to the gear 148 extends to the right as shown in Figure III and near the end thereof is a pulley shaft 151 carrying two pulleys 152 (Figure II). The pulley end of the lever 149 is normally under tension by means of a spring 153. one end of said spring being fixed to the lever and the other end to the tractor casing (Figure III). It is apparent therefore that up and down movement of the lever 149 will cause rotation of the drive control cam shaft 77 through the gear sectors 147 and 148 and thus place the transmission mechanism in proper position for forward, neutral, or reverse by reason of cams 82 and 80' dependent upon the degree of rotation of shaft 77 as heretofore explained.

A continuous wire line or rein 154 is shown as a flexible means for actually causing operation of the controls and is threaded through the hole 145' (Figure IX) and fastened therein by a set screw 156. The line is then given several turns around the drum and each of the free ends then passed around the pulley wheels 152 and 157 (Figures I, II, and III). The pulley wheels 157 are mounted in pulley block 158 supported from a standard 159 on the draw bar frame 17. From this point the reins ordinarily extend to the rear of the draw bar adjacent the driver's seat where a rein supporting rack 161 may be fixed. It is therefore evident that a pull on either rein rotates the steering clutch control shaft 139 and a pull on both reins simultaneously lifts the lever 149 against the tension of spring 153 thus rotating the drive control cam shaft 77.

In order to retain the drive control cam shaft 77 in a set neutral position, the normal inoperative position of all parts to which the mechanism should be brought by the operator, a latch mechanism 162 is employed (Figures IV to VIII). As illustrated in these figures, there are three parts to this latch, namely, a fixed supporting part 163 mounted on the tractor casing, a part 164 only transversely movable relative to the tractor being pivoted at 166, and a part 165 pivoted on part 164 and therefore movable both transversely and longitudinally of the tractor. Thus, part 164 is pivoted at its middle point on pin 166 carried by support 163 and this part 164 has a stop arm 167 yieldingly held against a stop 168 by means of a spring 169 fixed to the stop arm and the bracket 163. The part 164 has also a stop plate 170 which forms a stop for longitudinal movement of the part 165, and against the stop 170, the part 165 yieldingly held by means of a spring 171 fixed to the bracket 170 and the part 165. The part 165 is pivoted at 172 on the part 164 on an axis at right angles to the axis of pivot 166.

The pivoted latch element 165 has a projecting portion 173 on the side thereof adjacent the nose 149' of the lever 149, said part 173 having five cam surfaces; a pair of lower cams 174 and 174' with which the side and end of nose 149' engage, a middle cam 175 engaged by the end on said nose, and upper cams 176 and 178 at right angles to each other. A ledge, or recess 177 made between the middle and lower cams forms a latching edge portion for the nose of the lever 149.

The operation of the latching mechanism 162 in controlling the movements through which the drive control shaft actuating lever 149 must pass is as follows. The normal position of the latch operating mechanism is illustrated in full lines in Figure IV and in this position the lever 149 is held in neutral position by reason of the engagement of the nose 149' within the recess or over the ledge 177. In this position the gear 148 through the connection described pulls the control shaft 77 in such position that its cams maintain the disconnected position of the transmission mechanism.

In order to release the latch from engagement with the nose 149' the operator pulls slightly backward on the lines which swings the lever 149 upward against the action of the spring 153. In moving upward the end of the nose first engages the middle cam surface 175 tilting the lever 164 on its pivot 166 against the action of the spring 169 until the nose engages the smooth cammed surface 178 which, by the way is slightly curved as shown in Figures IV and VI in an arc whose center is the center of the pivoted arm 149. This requires but a relatively slight pull on the reins and the operator immediately releases the same whereupon the relatively strong spring 153 swings the lever 149 downwardly to forward position or until the nose 149' engages the stop pin 168'. When in this position, as will appear, the cam 82 of the control shaft 77 permits the transmission mechanism to couple up the drive and engine shaft direct.

To now move the device to neutral position or reverse, if desired, the operator pulls on the reins against the action of the spring 153. This causes the side of the nose 149' to engage the lower cams 174 and 174' as soon as the lever is pulled upwardly sufficiently. This forces the latch member 165 slightly forwardly relative to the tractor or to the left as illustrated in Figure V, swinging the same on the pivot 172 against the tension of the spring 171. Moreover, referring to Figures IV and VI, this movement causes the combined members 165 and 164 to swing to the right on the pivot 166 against the tension of the spring 169 until the nose 149' passes upwardly and sufficiently to miss the ledge 177 whereupon the spring 169 slips the ledge under the nose and if the operator then releases the reins the parts will be maintained latched in neutral position. To pass to reverse the operator simply pulls further on the reins. This will move the latch member 165 as before described in releasing the latch, but the nose 149' is moved off entirely from the latch members as shown in dotted lines in Figure IV. This permits the springs 169 and 171 to return the parts to normal position whereupon, when the operator releases the lines and the spring 153 swings the lever from reverse back to neutral, the side of the nose 149' will first engage the cammed surface 176, thereby tilting the part 165 forwardly, or to the left, in Figure V, on its pivot 172 against the action of the spring 171, the side of the nose 149' continuing downwardly in engagement with the upstanding edge of the cam portion 175, as will appear from an inspection of Figure V. When the nose 149' passes downward enough to come opposite the recess or ledge 177 the spring 171 immediately pulls the latching member 165 to the right in Figure V, latching the edge 177 under the nose. This will maintain the operating parts in neutral position until the cycle of operations is again carried out.

It will be noted that the operator can, of course, move directly from neutral to reverse, as will be apparent from the foregoing. Moreover, he can move the parts directly from forward to reverse without pausing at neutral position and from either forward or reverse the parts can be moved directly to neutral latched position.

In the operation of the tractor, the engine 12 is started by the hand crank 26, the lever 149 being latched in neutral as indicated in Figure III of the drawing. In this position the cam shaft 77 (see Figure X) has been rotated to a point where the end of the cam lever 83 is on the rear plane face of the cam 81 and off the cam surface 82, and where the cam 80' is not acting on the brake band jaws 74 and 75, thus opening the clutch members 47 and 53 and permitting free rotation of clutch member 47. In accordance with this seting the planetary gears 39 in rotating about the sun gear 42 idly rotate the orbital gear 45 and its attached clutch member 47.

Movement of the lever arm 149 to the downward or forward position from neutral caused by releasing the reins, causes rotation of the cam shaft 77 to the setting illustrated in Figure IX with the end of the lever 83, at the base of the cam surface 82. In this setting the brake bands 67 and 68 are still released permitting free rotation of the clutch element 46, and the clutch spring 59 is yieldingly holding the clutch elements 46 and 53 together. Consequently the clutch drum is driven as a unit by the rotating planetary gears and direct forward motion is transmitted from the engine shaft to the transmission shaft 32, hence through the planetary and sun gears to the drive shaft 40.

Movement from forward or neutral to reverse position of the transmission mechanism follows a back pull on the lines to their rear limit. In this position the cam lever 83 maintains its neutral relationship to the cam, holding the clutch elements 53 and 46 apart, but the further rotation of the cam shaft 77 results in the cam 80' forcing out the brake jaws (Figure XI) thus tightening the brake bands on the clutch element 46 and preventing rotation thereof. In this setting, since the orbital gear 45 is stationary by virtue of its connection with the clutch element 46 and brake, the planetary gears 39, having a larger diameter than integral gear 44, force the sun gear 42 in a reverse direction.

Attention is directed to the positive settings obtained in this form of the invention, there being a definite forward, neutral, and reverse setting to which the transmission is moved by the reins thereby avoiding any uncertainty in the control. Moreover, the cycle of operative movements necessary is reduced to a minimum and the action required is very simple and direct.

The steering operation, although capable of simultaneous action with the control, is independent of the transmission control, as the tension of both spring 153 and clutch spring 59 is such that a pull on either rein alone will be insufficient to move the lever arm 149. Consequently steering is readily obtained in the forward, neutral, or reverse positions or at any intermediate position of the cam control lever 149. In the process of steering a pull on the left rein, for example, screws rearward the steering control shaft 139 engaging the clutch 98 thus transmitting left handed rotation to the steering rod 129 and swinging the wheels to the left. A pull on the right rein reverses the operation.

In case a line is held in steering position until the pinion 132 travels the length of the rack the steering drive clutch on the steering shaft 94 slips thereby preventing injury to the mechanism.

Should the rein steering operation be disabled, or if it is, for any other reason, desirable, the steering rod 129 may be attached and rotated as desired to turn the tractor, rod 129 operating worm 130 and worm gear 131 to turn rack 133 as before.

An important modification with additional functional operations is illustrated in Figure XIII wherein I have shown, largely diagrammatically, a structure in which a tractor may be provided with a plurality of forward speeds, controlled in the general manner indicated above, and in which the variable speeds may also be controlled by the drive, as from the same controlling means utilized in controlling the tractor steering and driving mechanisms. In this modification the engine drive shaft 200 is connected on the one hand to the fly-wheel 201 of the tractor engine 202, and on the other hand to the planetary transmission 203, with the steering connections 204 placed on the shaft intermediate the engine and transmission gearing.

The steering mechanism proper is here embodied in two facing bevel gears 205 and 206 which are loosely mounted on the drive shaft 200 for rotary movement thereon, and ordinarily contact with a thrust collar 207 fixed to the engine shaft. The interconnecting bevel gear 208 meshes with both gears 205 and 206 and connects through shaft 209 with the rack pinion 210 through which pinion, motion is given the steering rack 211 in the ordinary manner.

Force is applied to the bevel gears and their direction of rotation is determined by a clutch mechanism which is adapted to be controlled by the driver in a manner presently to be described. The bevel gears 205 and 206 are formed with outer clutch surfaces 212 and 213 which cooperate with clutch members 214 and 215. The latter clutch members are splined to the drive shaft 200 so as to have slidable movement only relative thereto and this movement is controlled by two levers 216 and 217 which are pivoted at points 218 and 219 on the engine frame and are pivotally interconnected at their outer ends by a connecting rod 220.

The operative ends of the levers 216 and 217 are forked and bear in the annular channels 221 and 222 in the hubs of the clutch members 214 and 215 so that the clutch members are subject only to force imparted in an axial direction relative to the shaft. The pivoted interconnection of the clutch member permits successive application of each clutch and consequent application of force to the rack pinion 210 from the drive shaft 200 in any desired direction. The transmission mechanism 203 is of the planetary type (see Figure XVIII) and is adapted to give neutral, reverse, and intermediate, forward positions, and includes a sun gear 223, planetary gears 224, 225, and 226 and orbital gears 227 and 228.

The sun gear 223 is keyed to the drive shaft 200 and meshes with the planetary gear 225. The three planetary gears 224, 225 and 226 are fixed to a common shaft 229 and have different diameters, the gear 225 having the largest diameter, the gear 226 the smallest, and the gear 224 an intermediate diameter.

The gear 227 is loosely mounted on the drive shaft in mesh with the gear 224 and has a rigid connection through plate 230 with a cylindrical casing drum 231 which encloses a portion of the gear set. At the other end of the transmission the gear 228 meshes with the planetary gear 226, and is fixed on the transmission shaft 233. A short cylindrical casing 234 is attached to the gear 226 through a plate 235, this casing forming with casing 231 a complete enclosure for the gear wheels.

In order to hold stationary either casing with its attached gears, I employ similar brake bands 236 and 237 corresponding to that described with reference to Figure XI, in which—referring only to band 237—there are two parts, 238 and 239, pivoted together at one end and formed with co-acting jaws 240 and 241 at their other ends, a spring 242 normally urging the jaws together.

The jaws of either brake band are positioned in line with each other and are adapted to hold yieldingly the cams 243 and 244 of the cam rod 245. The camming points 246 and 247 of the cams 243 and 244 have bearing on opposite sides of the cam rod so that rotation of the cam rod in either direction will tighten a single brake band, the arrangement being such that the band 236 is tightened when the control is moved to reverse and the band 237 is tightened when the control is moved to forward. On the neutral or high speed position neither brake band is operative.

The cam mechanism described above is operated by a bevel gear 248 which intermeshes with a second bevel gear 249, the latter gear having connection to the control mechanism described below, through a lever bar 250 fixed to the bevel gear and adapted to rotate the same through a limited angle.

To the engine side of the gear plate 230 there is secured one element 251 of a cone clutch the other element 252 of which is splined slidably to the drive shaft 200 and is adapted to be moved into and out of engagement with its cooperating element 251 by a lever 253 pivoted at 254 and formed with forked arms 255 resting freely in the groove 256 formed on the clutch element 252. The cone clutch 251 is designed to transmit high speed torque to the transmission shaft 233 and thence through the worm gears 257 and 258, and differential 259 to the cross driving shafts of the machine.

The control mechanism is such that both an intermediate and full forward speed is secured as well as reverse, through the operation of a single pair of lines, and details of this control will now be considered.

The cone clutch lever 253 is extended through and appreciably beyond its pivot 254 forming a lever arm 260 the end of which carries a pulley 261. Between this pulley and pivot 254 is a pivot pin 262 to which one end of a latch rod 263 is secured, the other end of which has slidable engagement with a support 264 fixed to the tractor frame.

There are two latch devices adapted to cooperate with the rod 263, latches 265 and 266, the latch 265 being adapted to hold the control mechanism in neutral position and the latch 266 being adapted to permit movement of the control mechanism to intermediate forward and reverse positions and when inoperative to permit the mechanism to assume a full forward position.

The latch 265 (Fig. XV) is designed to cooperate with the cylindrical pin 267 projecting from the side of the latch rod 263. There are two elements in the latch 265. An element 268 pivotally mounted on a frame supported rod 269 for horizontal movement only, and an element 270, pivotally mounted at 271 on the element 268 for vertical movement only. Upper movement of the element 270 is limited by a finger 272 closely projecting over the pivot 271 from the latch support 269, and the element 270 is yieldingly maintained at its upper limit by means of a coil spring 273 between the two latch elements. Lower movement of the latch element 270 is limited by a horizontal bar 274 attached to the tractor frame and on which the control rod 263 is slidable.

Horizontal movement of the latch is limited on one side by a tractor frame member (not shown) between which end and the latch element 268 a coil spring 275 is positioned, and on the other side by the latch rod 263 against which the element 270 contacts at the limit of its movement.

In neutral position the pin 267 rests in a notch or depression 276, the forward or inner wall 277 of which is vertical and the outer or rear wall 278 of which is inclined so that the pin 267 is held from forward movement if resting in the depression but may ride out of the depression on the rear side.

The side edge 279 of the depression is in line with the body of the element 270 so that should the pin be moving to the rear from a forward position it would ride on the edge 279, the element being maintained close to the rod 263 by the coil spring 275.

Adjacent the end of the element 270, the side toward the latch rod 263 is inclined away therefrom forming the camming surface 280, the object of this surface being to force over the latch when the pin 267 engages the same as it moves forwardly.

The operation of the latch 260 is as follows: With the pin in neutral position in the depression 276 as shown in Figure XV, to release the same and permit the control rod to move forward the rod is pulled backward until the pin is completely out of the depression when the spring 275 swings the whole latch over toward the rod, the side 279 of the depression moving into line with the pin and permitting the same to ride over the depression without entering the same. To return to neutral position the rod is pulled back until the pin is free of the latch when the element 270 is lifted by the spring 273 into line with the pin. Thereupon when the rod again moves forward the pin contacts against the cam surface 280 swinging the latch away from the rod until the pin is opposite the notch 276 when the spring 275 returns the latch against the control rod and the pin enters the neutral notch.

It is thus apparent that the latch 265 is designed to hold the control rod 263 in a set neutral position.

The latch 266 forms the connection between the control rod 263 and the transmission cam lever 250 and is therefore operative to move the transmission to intermediate forward or reverse positions. Referring to Figure XIV the cam lever 250 is shown as terminating in an offset arm 281 with an upper projection 282 serving as a pivot support for the latch element 283.

The latch element 283 is formed with a latch 284 and two camming surfaces 285 and 286. The latch 284 is adapted to enter an upwardly offset notch 287 formed with vertical sides in the central rod 263 and is designed to move the cam lever 250 through this connection. As illustrated in Figure XIV the latch is yieldingly maintained in latched position by a coil spring 288 which seats on the cam lever 250 beneath the latch element 283.

The camming surface 285 is on the side of the latch element 283 away from the control rod and is inclined toward the rod in the direction of forward movement thereof. Mounted in a cavity 289 formed in a frame member 290 adjacent the control rod 263 and in advance of the neutral position of the cam lever 250 is a pin 291. This pin is yieldingly held in an extended position near the control rod and in line with the forward moved cam surface 285 by means of a coil spring 292 positioned within the cavity 289 and surrounding a portion of the pin 291. Forward movement, therefore, of the cam rod 250 will cause the cam surface 285 to contact with the pin 291 and force it into its cavity against the pressure of coil spring 292, thus permitting the cam rod and its attached latch 266 to pass beyond the pin.

As soon as the latch 266 is moved beyond the pin 291, the latter springs back to normal position urged by the spring 292, behind the pin. It is apparent from Figure XIV of the drawing that a return movement of the latch will cause the pin to contact with the second camming surface 286, which is formed on the upper wall of the latch element 283 adjacent the rear end thereof and is inclined toward the rear and outwardly relative to the control rod 263.

Contact of the pin 291 on the surface 286 will force down the latch element 283 against the yielding element 288 until the latch 284 clears the notch 287 in the control rod; whereupon the rod 263 may be moved forward independently of the latch 266 and lever 250.

Movement of the entire control mechanism is governed by a pair of reins or lines 293 and 294 which ride on the loose pulley 261 on the end of the cone clutch lever 253, on the loose pulley 295 loosely mounted on the clutch lever pivot pin 254, and encircle, and are preferably fixed to, the pulley 296 secured rigidly with the clutch lever 217. In the steering operation it is merely necessary that a single rein be pulled by the driver which causes rotation of the pulley 296 and consequent movement of the rigidly connected clutch steering units. Thereupon power is transmitted from the engine shaft 200 to the steering rack 211 and steering wheels. A pull on the other rein will reverse the operation.

The transmission is affected by pulling simultaneously on both reins, the action here being to move the cone clutch lever rod 253 about its pivot 254. In the position of the mechanism as shown in Figure XIII the cam rod 250 is held in neutral position through action of the cam springs 242 and in consequence of the latch pin 267 being held in the latch 265 by the pull of the springs 297, which latter member is fixed at one end to the upper end of the cone clutch extension 260 and at its other end to a stationary frame member 298.

Should the operator desire to move to intermediate speed forward the lines are simultaneously pulled to draw the pin 267 of the latch 265 out of the notch 276 and upon the latch surface 278. The lines are then relaxed and the spring 297 draws the control rod 263 with the latched cam lever 250 forward to a point where the pin 291 is just behind the cam surface 286 of the cam latch 266. In this position the lever is held by the transmission brake band 236 which is functioning to restrain the gears, proper for this degree of speed.

To pass from intermediate to full forward speed it is necessary only to retract slightly the lines sufficiently to cam out the latch 284 through the intermediary of the pin 291 and cam surface 286. Subsequent relaxation of the lines will permit the spring 297 to draw the control rod forward to a position limited by the operative contact of the cone clutch members 252 and 251, in which positions the drive is directly from the engine drive shaft 200 through the cone clutch gears 226 and 228 to the transmission shaft.

Change of speed from full forward to neutral is accomplished by merely pulling the control rod 263 backward to such a point where the notch 287 latches with the upright standing latch 284 and the rod pin 267 clears the latch member 265 to the rear thereof. Then, by permitting a slight forward movement of the rod, the pin 267, cams out the surface 280 of the latch 265 and snaps into the notch 276.

Reversal of the cam lever is effected merely by a back pull from neutral which operates the transmission brake band 237.

It should be noted that in passing from intermediate speed to full forward or neutral the cam lever is released from the control rod and is carried back to neutral position by means of the brake band springs 242 in the transmission. Also, in order to assure proper engagement of the notch 287 and latch 284, the notch is ordinarily formed somewhat longer than the latch giving a little free play. In some instances also the forward wall of the notch has a depth greater than that of the rearward wall thus causing a projection suitable to engage without fail the latch 284 in the rearward movement of the control rod.

Attention should be also drawn to the fact that where the steering operation is continued indefinitely, through improper handling, so that the pinion 210 moves to the limit of the rack, breakage is prevented by the slipping of the corresponding clutch members.

In Figure XVI I have illustrated a modification of the arrangement of Figure XIII wherein the pulleys are eliminated from the control and the lines are connected to a single controlling rod for all operations.

Referring to Figure XVI the control rod 300 is extended beyond its pivot connection 301 with the cone clutch rod extension 260 to a main operating rod 302 with which it has pivoted connection by means of a band 303 enclosing the operating rod 302 but so mounted as to permit rotation of the rod while at the same time limiting its position as regards forward and rearward movement. The coil spring 304 is attached to the band 303 and a section of the tractor frame 305 and tends to move both the control rod 300 and operating rod 302 to forward position.

The operating rod 302 is a prolongation of the pivot pin 219 of Figure XIII and since the steering mechanism of this modification is essentially the same as that of Figure XIII it is apparent that rotation of the rod 302 operates to move the steering mechanism in a manner similarly to that dissembled with reference to Figure XIII. For carrying on the steering operation the lines 293 and 294 are attached to side extending arms 306 and 307 so that a pull on either line serves to rotate the operating rod and initiate the steering movement.

In order to permit simultaneous rotation and bodily movement of the control rod 300, the operating rod 302 is constructed with a universal joint 308 about midway of its length. With this construction the steering operation may be carried on at any point in the movement of the transmission control mechanism.

The various latches, the transmission and other details of this arrangement are similar to those dissembled with reference to Figure XIII.

The modification of Figure XVII has a single difference over the disclosure of Figure XVI, in that there is a single forward speed effected by the cone clutch 251 in place of the two speeds forward. In this arrangement the cam lever 400 is pivotally attached to the control rod 300 and operates directly the reverse cam 401 instead of through bevel gears, and the gear box includes only the gears 223, 225, 226 and 228, the gears 224 and 227 being eliminated. The latch 265 is utilized to hold the mechanism in neutral in the manner described with reference to Figure XIII.

It is apparent that the invention may be carried out by way of numerous detailed structural mechanisms, the various drawings and modifications described being merely illustrative of the application of the principles involved.

What I claim is:

1. A latch device for levers having in combination a standard; a support pivoted to the standard; and a latch pivoted to the support, said latch having a holding ledge and camming surfaces on either side of the ledge, one of said surfaces being operative to move the latch in a direction transverse to that in which the latch is moved by the other surface.

2. A latch device for levers having in combination a standard; a support pivoted to the standard; and a latch pivoted to the support, said latch having a holding ledge and camming surfaces on either side of the ledge, one of said surfaces being operative to move the latch on its pivot and the other surfaces being operative to move both the latch and its support on the support pivot.

3. A latch device for levers having in combination a standard; a support pivoted to the standard; and a latch pivoted to the support, said latch having outer and middle cam surfaces, the outer cam surfaces tending to move the latch on its pivot and the middle surface tending to move both the latch and support on the support pivot.

4. A latch device for levers having in combination, a standard; a support pivoted to the standard; a latch pivoted to the support, said latch having outer and middle cam surfaces, the outer cam surfaces tending to move the latch on its pivot and the middle surface tending to move both the latch and support on the support pivot; and means normally opposing movement of the latch on its pivot.

5. In combination, a lever member having a contact terminal and having a normal plane of movement; a latch member adapted to engage said lever contact terminal; said latch member comprising a standard, a support pivoted on the standard for movement in a plane parallel to that of the lever member; a latch pivoted to the support in a plane transverse to the lever plane of movement, said lever terminal when shifted in its plane of movement being adapted to shift the latch transversely to the lever plane and then successively shift the latch and support in the lever plane.

6. In combination, a lever member having a contact terminal and having a normal plane of movement; a latch member adapted to engage said lever contact terminal; said latch member comprising a standard, a support pivoted on the standard for movement in a plane parallel to that of the lever member; a latch pivoted to the support in a plane transverse to the lever plane of movement, said lever terminal, when shifted in its plane of movement, being adapted to shift the latch transversely to the lever plane and then successively shift the latch and support in the lever plane; and resilient means tending to resist movement of the latch.

7. In combination, a lever member having a contact terminal and having a normal plane of movement; a latch member adapted to engage said lever contact terminal; said latch member comprising a standard, a support pivoted on the standard for movement in a plane parallel to that of the lever member; a latch pivoted to the support in a plane transverse to the lever plane of movement, said lever terminal when shifted in its plane of movement being adapted to shift the latch transversely to the lever plane and then successively shift the latch and support in the lever plane; and a ledge on the latch adapted to hold the lever in position on the latch.

8. In combination, a lever member having a contact terminal and having a normal plane of movement; a latch member adapted to engage said lever contact terminal; said latch member comprising a standard, a support pivoted on the standard for movement in a plane parallel to that of the lever member; a latch pivoted to the support in a plane transverse to the lever plane of movement, said lever terminal when shifted in its plane of movement, being adapted to shift the latch transversely to the lever plane and then successively shift the latch and support in the lever plane; a ledge on the latch adapted to hold the lever in position on the latch; and means normally tending to move said lever out of engagement with the latch.

In testimony whereof, I affix my signature.

CARL P. BROCKWAY.